Aug. 6, 1968 G. V. MIRAM 3,396,339
CAPACITIVE VOLTAGE SENSING DEVICE INCLUDING COAXIALLY
DISPOSED CONDUCTIVE TUBES AND ELECTRICAL
DISCHARGE INHIBITION MEANS
Filed Nov. 29, 1963 2 Sheets-Sheet 1
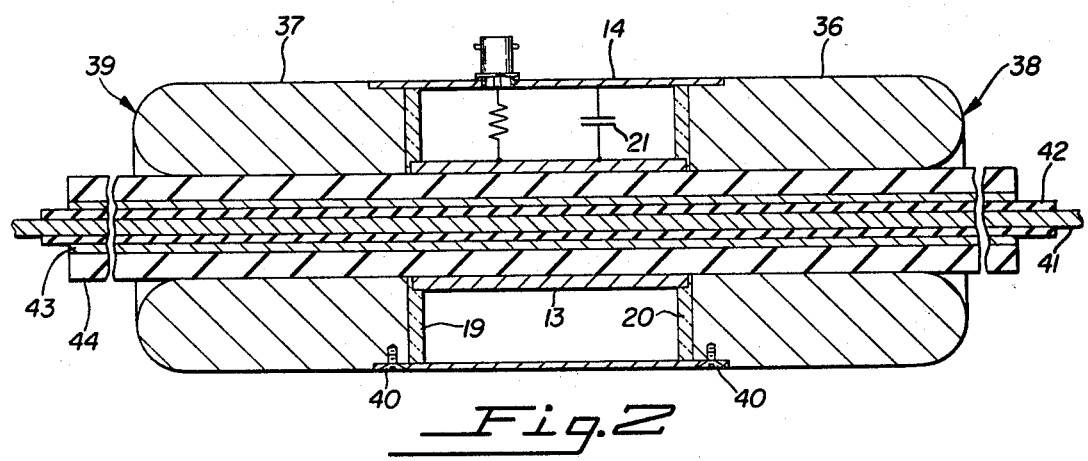
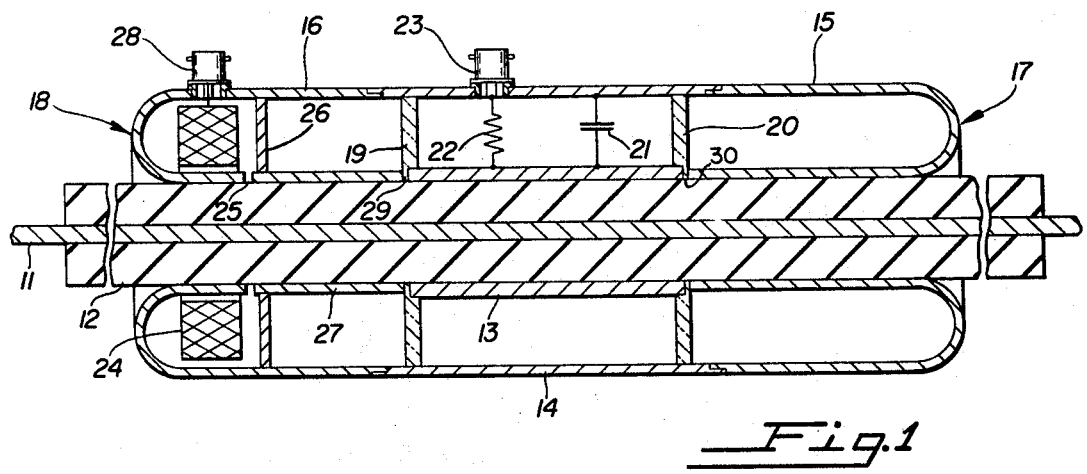
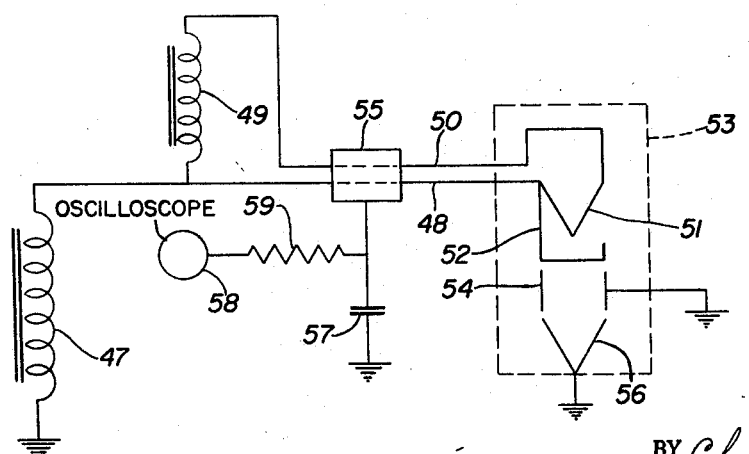
INVENTOR.
GEORGE V. MIRAM
BY Charles R. Lepchinsky
Robert W. Dilts
ATTORNEYS Aug. 6, 1968 G. V. MIRAM 3,396,339
CAPACITIVE VOLTAGE SENSING DEVICE INCLUDING COAXIALLY
DISPOSED CONDUCTIVE TUBES AND ELECTRICAL
DISCHARGE INHIBITION MEANS
Filed Nov. 29, 1963 2 Sheets-Sheet 2

INVENTOR.
GEORGE V. MIRAM
BY Charles R. Lepschinsky
Robert W. Dilts
ATTORNEYS

United States Patent Office 3,396,339
Patented Aug. 6, 1968

3,396,339
CAPACITIVE VOLTAGE SENSING DEVICE INCLUDING COAXIALLY DISPOSED CONDUCTIVE TUBES AND ELECTRICAL DISCHARGE INHIBITION MEANS
George V. Miram, Daly City, Calif., assignor, by mesne assignments, to Varian Associates, a corporation of California
Filed Nov. 29, 1963, Ser. No. 327,016
10 Claims. (Cl. 324—126)

ABSTRACT OF THE DISCLOSURE

A capacitive voltage sensing device having two radially-separated and capacitively-linked, coaxially disposed, conductive tubes. Output means are electrically coupled to the capacitance. Arcuate end members inhibit electrical discharge between the voltage conductor and the ends of the tube adjacent thereto.

This invention relates to voltage sensing devices and more particularly to a shielded capacitive voltage sensing device utilized in conjunction with high voltages.

In order to measure and observe high voltage signals, it is necessary to decrease the magnitude of the signals in some manner because common and generally used electrical measuring instruments are designed to accept and respond to voltage potentials of only a few hundred volts or less. Although resistive elements, such as a resistor voltage divider connected in parallel with the high voltage to be monitored, can provide satisfactory reduction of D.C. voltages, they cannot provide appropriate voltage reduction of high frequency signals without greatly distorting the shape of such signals. This is due to the large inductance inherent in resistor elements capable of handling high voltages and large amounts of power.

Accordingly, heretofore in the prior art, capacitive voltage dividers have generally been used to reduce the voltage magnitude of high voltage high frequency signals. Such voltage dividers usually include two serially connected capacitors that are connected directly in parallel across the voltage source that is to be monitored. When a voltage signal is applied across the pair of serially connected capacitors, the voltage across each capacitor is inversely proportional to the ratio of its capacitance to the total capacitance of the two serially connected capacitors. Because of the high magnitudes of voltages involved, such prior art capacitive voltage dividers are physically large, heavy and bulky and must be carefully designed to prevent corona discharges.

It is therefore an object of this invention to provide improved apparatus for reducing the magnitude of high voltage, high frequency signals.

Another object of this invention is to provide improved and simplified apparatus for reducing the magnitude of high voltage, high frequency signals that is not connected directly in parallel with the voltage source to be monitored.

Still another object of this invention is to provide capacitive apparatus for reducing the magnitude of high voltage, high frequency signals that is considerably smaller and lighter in weight than capacitive voltage dividers previously used to monitor similar high voltage magnitude signals.

Another object of this invention is to provide a simple and relatively inexpensive capacitive voltage sensing device for monitoring the magnitude and shape of high voltage, high frequency signals.

A further object of this invention is to provide a simple and improved shielded capacitive voltage sensing device.

These and other objects of the present invention are accomplished with a capacitive voltage sensing device that includes a first electrically conductive tubular member that is adapted to surround and be insulated from a voltage conductor. A second electrically conductive tubular member surrounds and is spaced apart from the first tubular member. A capacitance is coupled between the first tubular member and a reference potential, such as ground potential, which may be applied to the second tubular member. Output means are coupled to the capacitance and means for inhibiting an electrical discharge between the voltage conductor and the first and/or second tubular member is provided.

This invention as well as other objects, features and advantages thereof will be readily apparent from consideration of the following detailed description relating to the following drawings in which:

FIGURE 1 illustrates a cross-sectional view of one embodiment of the present invention;

FIGURE 2 illustrates a cross-sectional view of another embodiment of the present invention;

FIGURE 3 is a schematic illustration of one application of the present invention in conjunction with a beam power tube;

Figure 4:
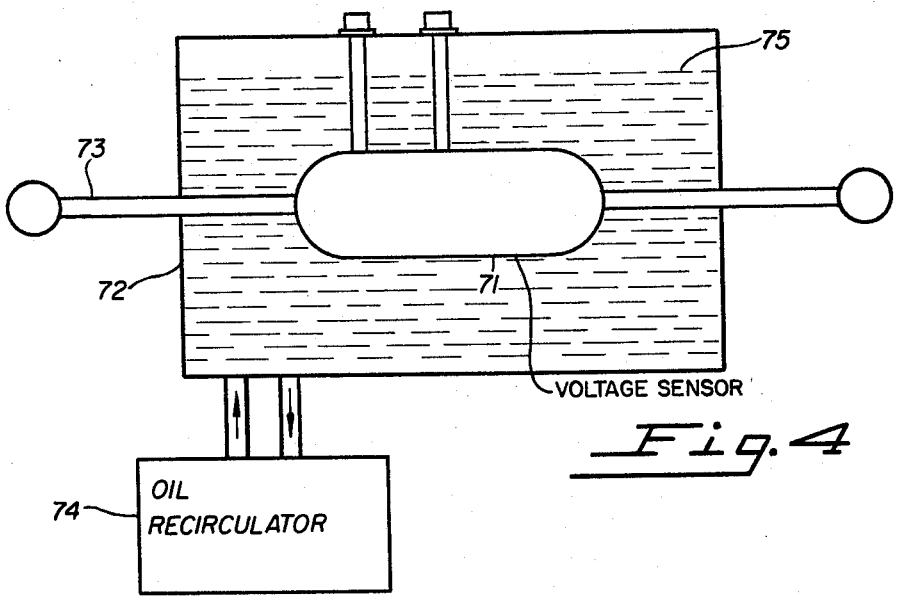
FIGURE 4 is a schematic illustration of another embodiment of the present invention.

Referring now to the drawings, wherein like reference characters designate like or corresponding parts throughout the several views, there is illustrated in FIGURE 1 a high voltage and current transmission line which includes an electrical conductor 11 fabricated from any suitable material, such as copper or aluminum, surrounded by a layer of insulation 12. The transmission line may comprise a coaxial cable which has had its outer conductor removed.

Heretofore in the prior art, a high voltage signal appearing on the conductor 11 would be monitored by connecting a capacitive voltage divider between the conductor 11 and a suitable reference potential, such as ground, thereby causing the full voltage on the conductor 11 to appear across the voltage divider. The novel device comprising the present invention, however, is not directly connected to the conductor 11 but rather surrounds the insulated 12 voltage conductor 11 in a manner as illustrated in FIGURE 1.

The embodiment of the present invention illustrated in FIGURE 1 comprises a first annular or elongated tubular member 13 which surrounds the insulation 12 covering the conductor 11 and is fabricated from any suitable electrical conductive material, such as copper or aluminum. The first tubular member 13 also surrounds the conductor 11 and forms a capacitance therewith the magnitude of which is determined by the length of the tubular member 13. Inasmuch as the capacitance per unit length of a coaxial line is easily determined, the magnitude of the capacitance created by the first tubular member 13 and the conductor 11 can readily be calculated because the first tubular member 13 and the conductor 11 form a section of coaxial line having a dielectric composed of the insulation material 12.

Surrounding the first tubular member 13 and spaced therefrom is a second annular or tubular member 14 which is fabricated from any suitable electrical conductive material, such as copper or aluminum. Secured to each end of the second tubular member 14 by any suitable means, such as by brazing, are re-entrant sections 15 and 16 which may be formed from a relatively thin sheet of any suitable electrical conductive material, such as copper or aluminum. The exposed end portions 17 and 18 of the two re-entrant sections 15 and 16 respectively, are curved for reasons discussed hereinbelow. The ends of the inner diameter portions of each of the re-entrant sections 15 and 16 are adjacent an end of the first tubular member 13 thereby forming gaps 30 and 29, respectively. The inner diameter ends of the re-entrant sections 15 and 16 are insulated and spaced apart from the ends of the first tubular member 13 by the annular insulating washers or rings 19 and 20 which also function to electrically insulate and position the first 13 and second 14 tubular members.

It is not necessary to fabricate the second tubular member 14 and the re-entrant sections 15 and 16 separately inasmuch as they may be fabricated from a single second tubular member 14 having an extended length the ends of which are turned inwardly into the second tubular member so that the ends thereof are adjacent the ends of the first tubular member 13. This construction is possible because the re-entrant sections 15 and 16 are electrically connected to the second tubular member 14.

A capacitor 21 is electrically coupled between the first 13 and second 14 tubular members and output means, including a resistor 22, are coupled to the first tubular member 13 and extend through the second tubular member 14 by way of a coaxial output connector 23 which has its outer conductor electrically coupled to the second tubular member 14.

Current sensing means, such as an annular current sensing coil 24, may be located within one of the re-entrant sections as illustrated in FIGURE 1. In order to permit flux coupling to the current sensing coil 24, an annular air gap 25 is formed on the inside diameter of one of the re-entrant sections 16, or on the inwardly turned portion of a second tubular member, in the vicinity of the current sensing coil 24. An annular ring 26 physically supports the tubular member 27 which results from forming the annular air gap 25 necessary for operation of the current sensing coil 24. The annular ring 26 is fabricated from any suitable electrical conductive material, such as copper or aluminum, and is secured to the resulting tubular section 27 and the remainder of the re-entrant section 16 by any suitable means, such as by brazing.

The device illustrated in FIGURE 1 is operated by inserting the transmission line, including the insulated 12 conductor 11, into the shielded capacitive voltage sensing assembly comprising the first 13 and second 14 tubular members and the re-entrant end sections 15 and 16. Whenever a high voltage signal is applied to the conductor 11, the voltage signal appears undistorted across a series capacitive network formed by the capacitance existing between the first tubular member 13 and the electrical conductor 11 which is in series with the capacitor 21. By selecting a magnitude of capacitance for the capacitor 21 that is very much larger than the capacitance existing between the first tubular member 13 and the electrical conductor 11, only a small fraction of the voltage appearing on the electrical conductor 11 appears across the capacitor 21. The voltage across the capacitor 21 also appears at the first tubular member 13 and is measured or observed by applying appropriate indicating instruments to the coaxial output connector 23 the center conductor of which is coupled to the capacitor 21 and the first tubular member 13 by way of a resistor 22.

The current created by applying a high voltage signal to a load by way of the conductor 11 can be observed or measured by applying the appropriate indicating instruments to the coaxial output connector 28 which is connected to the windings of the annular current sensing coil 24. The second tubular member 14 and the re-entrant end sections 15 and 16 are preferably at a reference potential, such as ground potential. It is to be understood that the device illustrated in FIGURE 1 is not an integral part of the transmission line which it surrounds but is readily separated therefrom.

Since the novel apparatus illustrated in FIGURE 1 forms a section of coaxial line with the transmission line comprising the electrical conductor 11 and the insulation 12, the breakdown voltage of the combination is equal to the breakdown voltage of the resulting coaxial line. In order to prevent the electric lines of force created by a high voltage applied to the electrical conductor 11 from concentrating at a sharp edge or surface and causing an electrical discharge, such as a corona discharge, is is necessary that the gaps 25, 29 and 30 be kept small so that they appear to electric lines of force as a short circuit. This is accomplished by causing the gaps 25, 29 and 30 to be no larger than several mils. For example, gaps having a width of five mils were found to be satisfactory for voltage signals on the conductor 11 in excess of 280 kilovolts. Accordingly, the annular spacing and insulating rings 19 and 20 are preferably formed from any suitable insulating material, such as Teflon, which has a breakdown voltage of approximately 40 volts per mil. Inasmuch as the voltage on the first tubular member 13 is equal to the voltage across the capacitor 21 which is preferably less than 200 volts, the gaps 25, 29 and 30 may be readily held to a width of five mils or less by utilizing a material, such as Teflon, to form the insulating rings 19 and 20.

Since the second tubular member 14 and the re-entrant end sections 15 and 16 are at ground potential, they effectively shield the capacitor 21 and the first tubular member 13 from any stray R.F. fields. Also, it is not necessary that current flow through the conductor 11 for a voltage signal to appear across the capacitor 21. However, such a current is necessary to induce an output signal current in the current sensing coil 24. Since the device of FIGURE 1 provides means for monitoring both the voltage and current carried by the conductor 11, it may be utilized to determine the peak power carried by the conductor 11. Also, the exposed end portions 17 and 18 of the re-entrant sections 15 and 16 are curved to inhibit an electrical discharge, such as a corona discharge, between them and the electrical conductor 11.

The apparatus illustrated in FIGURE 1 is light weight, easily fabricated and is dimensionally small in comparison to prior art devices utilized to monitor high voltage signals. For example, an apparatus according to FIGURE 1 capable of reducing the magnitude of voltage signals in excess of 280 kilovolts had a length of about 9 inches, an inside diameter of about 1¼ inches, an outside diameter of about 3¼ inches and the curved end portions 17 and 18 of each re-entrant section 15 and 16, respectively, had a radius of curvature of about 2 inches. As will be obvious to those skilled in the art, these dimensions are considerably smaller than prior art devices used to reduce the magnitude of similar high voltage signals.

When utilized in combination with voltage signals having a magnitude of 100 kilovolts or more, the device of FIGURE 1 is immersed in oil as is more fully discussed hereinbelow. Also, when the device is utilized for monitoring signals having wide pulse widths, the measuring instrument coupled to the connector 23 preferably has a high impedance. For example, the output signal appearing at the coaxial connector 23 may be applied directly to the deflection plates of an oscilloscope.

Referring now to FIGURE 2, there is illustrated a cross-sectional view of a modification of the device illustrated in FIGURE 1 in which a current sensing coil 24 is not utilized. Annular or tubular end pieces 36 and 37 fabricated from any suitable electrical conductive material, such as copper or aluminum, having inside diameters substantially equal to the inside diameter of the first tubular member 13 are secured to the second tubular member 14 by any suitable means, such as the screws 40. The inner diameter end portions of the annular members 36 and 37 are respectively adjacent opposite ends of the first tubular member 13 and are separated therefrom by the annular insulating rings 20 and 19 in a manner as discussed hereinabove in detail. The exposed ends 38 and 39 of each of the annular members 36 and 37, respectively, are curved to prevent an electrical discharge, such as corona discharge, also as discussed hereinabove. The shielded capacitive device of FIGURE 2 surrounds a transmission line which comprises a first or center conductor 41 which is surrounded by a layer of insulation 42 and a second conductor 43 which surrounds the layer of insulation 42. Another layer of insulation 44 surrounds the second conductor 43.

The transmission line illustrated in FIGURE 2 is utilized where it is desirable to apply an A.C. current, such as an A.C. filament current, over the same transmission line that carries the high voltage signals. For example, an A.C. filament current may be applied between the first and second conductors 41 and 43 respectively, and high voltage signals may be applied to the second conductor 43. Such a transmission line is useful in supplying power to a beam power tube as is illustrated in FIGURE 3.

Referring now to FIGURE 3 which is a schematic representation of a method of applying power to a beam power tube, there is shown a pulse transformer 47 which supplies a high voltage signal to the lead 48 which corresponds to the second conductor 43 of FIGURE 2. A filament transformer 49 supplies A.C. current to the lead 48 and the lead 50 which corresponds to the center conductor 41 of FIGURE 2. The leads 48 and 50 are coupled to the filament 51 and the cathode 52 of a beam power tube, indicated within the dashed lines 53, which also includes an R.F. section 54 and a collector 56. The first tubular member 13 illustrates in FIGURES 1 and 2 surrounds the conductors 48 and 50 and is represented by the reference character 55. The A.C. filament current flows along the leads 48 and 50 in opposite directions thereby causing its associated alternating magnetic and electric fields to cancel one another. However, the high voltage pulses generated by the pulse transformer 47, and appearing on the lead 48, are seen reduced in magnitude across the capacitor 57 which corresponds to the capacitor 21 of FIGURES 1 and 2 and are applied to the oscilloscope 58 by way of the resistor 59. When the high voltage signal applied to the cathode 52 from the pulse transformer 47 is about 100 kilovolts or greater, the voltage sensing device illustrated in FIGURES 1 and 2, the cathode and filament section of the beam power tube 53, and the pulse and filament transformers 47 and 49 are all immersed in oils as illustrated in FIGURE 5.

Figure 5:
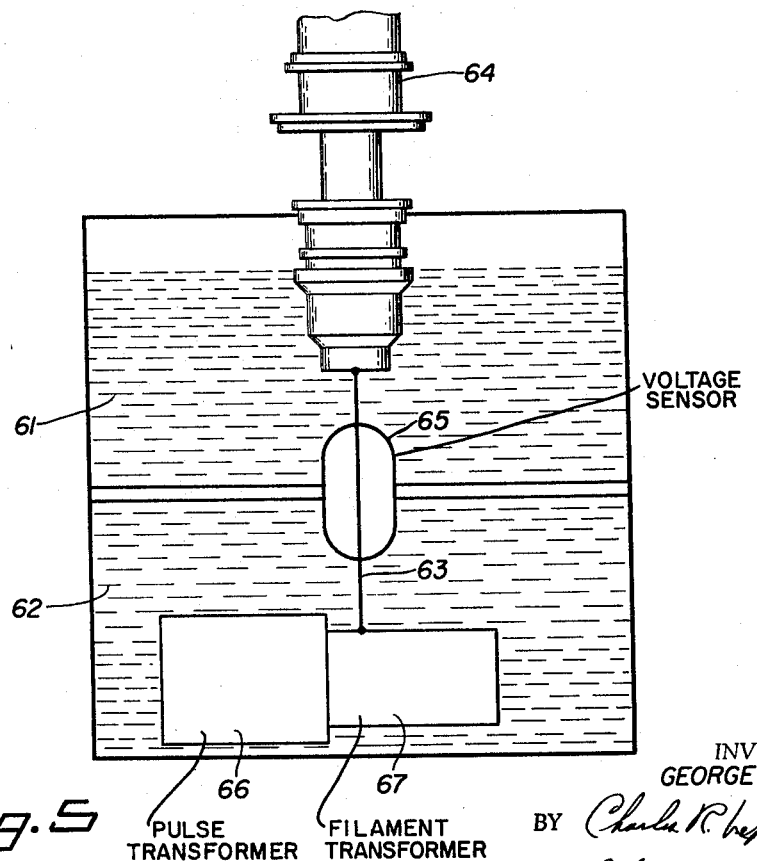
FIGURE 5 is a schematic illustration of another application of the present invention in conjunction with a beam power tube.

Referring now to FIGURE 5, there is shown in schematic form an oil container having a first 61 and second 62 oil chamber. Pulse and filament transformers 66 and 67 respectively, are located in the lower or second oil chamber 62 and a transmission line 63 extends therefrom into the second oil chamber 61 and is connected to the cathode or electron gun section of the beam power tube 64. A capacitive voltage sensing device 65, such as that illustrated in FIGURES 1 and 2, surrounds the transmission line 63 and acts as an oil bushing between the two oil chambers 61 and 62. The output signal voltage developed by the capacitive voltage sensing device 65 is available outside of the oil container by way of a coaxial line (not shown) extending from without the oil container to the capacitive voltage sensing device 65.

The voltage magnitude appearing across the capacitor 21 illustrated in the devices of FIGURES 1 and 2 may be adjusted by making the capacitor 21 adjustable or by connecting a trimmer capacitor (not shown) in parallel with the capacitor 21 thereby causing the ratio of the capacitance formed by the conductor 11 and the first tubular member 13 to the value of the capacitance of the capacitor 21 to be variable. Since the magnitude of the capacitance formed by the conductor 11 and first tubular member 13 may be calculated with reasonable accuracy and since the capacitance of the capacitor 21 is readily obtainable, the devices illustrated in FIGURES 1 and 2 can be designed with a reasonably accurate value of capacitance or reduction ratio. However, for some applications, it may be desirable to have an even more accurate figure of the capacitance ratio. This may be accomplished by a secondary standard to which other capacitance voltage sensing units, such as those illustrated in FIGURES 1 and 2, could be compared.

Such a secondary standard is illustrated in FIGURE 4 which shows a capacitive voltage sensing unit 71, such as that illustrated in FIGURES 1 and 2, encased in an oil 75 filled container 72 which may be formed from any suitable material, such as Lucite. The voltage sensing unit 71 surrounds a bare uninsulated voltage conductor 73 that extends out of opposite ends of the oil container 72. An oil recirculator 74 maintains the oil 75 within the container 72 at a constant temperature.

Since the conductor 73 is not covered by a layer of insulation, the voltage sensing unit 71 is positioned by any suitable means (not shown) within the container 72 so that its first tubular member 13 (illustrated in FIGURES 1 and 2) is spaced apart from but substantially concentrically surrounds the conductor 73 thereby causing the oil 75 to be the dielectric material for the capacitance formed by the conductor 73 and the first tubular member 13. Also, the capacitor 21 (illustrated in FIGURES 1 and 2) of the voltage sensing device 71 is such that the oil 75 constitutes its dielectric material. This can be accomplished by using an air capacitor that obtains an oil dielectric when it is immersed in the oil 75 as part of the voltage sensing unit 71. When used as a secondary standard, the second tubular member 14 (illustrated in FIGURES 1 and 2) may be perforated to permit passage of the oil 75 into the interior of the voltage sensing unit 71. As will be obvious to those skilled in the art, the constant temperature oil 75 in the container 72 provides an unchanging dielectric medium for the capacitances of the voltage sensing unit 71.

The capacitance or reduction ratio of the voltage sensing device 71 is accurately determined for a constant temperature of the oil 75 by the use of primary standard capacitors or by the use of an accurately known source of high voltage signals. The capacitance or reduction ratio of other voltage sensing devices is then accurately determined by connecting their associated insulated transmission line in series with the uninsulated conductor 73 and then applying a high voltage signal to the associated transmission line or the conductor 73. By comparing the output voltage of the voltage sensing unit 71 with the output voltage of the sensing device being tested, the capacitance or reduction ratio of the unit being tested may be readily determined because the capacitance ratio of the secondary standard 71 is accurately known.

What has been described is a new and novel shielded capacitive voltage sensing device that is smaller and lighter than apparatus heretofore used to reduce the magnitude of high voltage signals and which is not connected directly in parallel with the voltage source to be monitored.

What I claim is:

1. A capacitive voltage sensing device comprising a first electrically conductive tubular member adapted to surround a voltage conductor, a second electrically conductive tubular member adapted to surround and spaced apart from said first tubular member, hollow, electrically conductive re-entrant members electrically connected to said second tubular member, said hollow, re-entrant members being coaxial with said first tubular member and axially spaced from each end thereof to define gaps therebetween, said gaps being small enough to inhibit an electrical discharge between said voltage conductor and the ends of said first tubular member, a capacitance electrically coupled between said first tubular member and a reference potential, and output means electrically coupled to said capacitance.

2. The combination according to claim 1 wherein at least a portion of the surface of each of said hollow, electrically conductive re-entrant members is curved to inhibit an electrical discharge between said voltage conductor and said conductive means.

3. The combination according to claim 1 further including insulating spacing means interposed between each end of said first tubular member and each said hollow, re-entrant members.

4. Claim 1 wherein said first tubular member and said re-entrant members are disposed approximately radially equidistant from said voltage conductor.

5. A shielded capacitive voltage sensing device comprising a first tubular member adapted to surround a voltage conductor, a second tubular conductor member surrounding and spaced apart from said first tubular member, first and second conductive arcuate, re-entrant shielding means circumferentially attached to each end of said second tubular member and having an inner diameter substantially equal to the diameter of said first tubular member, insulating spacing means interposed between each said first and second shielding means and the ends of said first tubular member, at least one capacitor electrically coupled between said first and second tubular members, and output means electrically coupled to said capacitor.

6. A shielded capacitive voltage sensing device comprising a first conductive tubular member adapted to surround a voltage conductor, said first tubular member cooperating with said voltage conductor to form a first capacitance therewith, a second conductive tubular member surrounding and spaced apart from said first tubular member, first and second electrically conductive annular bodies electrically and mechanically secured to said second tubular member and having an inner diameter substantially equal to the diameter of said first tubular member, said first and second bodies having at least a portion of their exterior surface curved to inhibit electrical discharge between said voltage conductor and said first and second annular bodies, insulating spacing means interposed between the ends of said first tubular member and said first and second annular bodies, a capacitor having a value of capacitance greater than said first capacitance coupled between said first and second tubular members, and output means coupled to said capacitor.

7. The combination according to claim 6 wherein the space between the ends of said first tubular member and said first and second annular bodies is small enough to inhibit a corona discharge from said voltage conductor to the ends of said first tubular member.

8. A shielded capacitive voltage sensing device comprising a first tubular conductive member adapted to surround a voltage conductor, a second tubular conductive member surrounding and spaced apart from said first tubular member, said second tubular member having end portions turned inwardly into said second tubular member so that the ends thereof lie adjacent the ends of said first tubular member, the ends of said first tubular member and the inwardly turned end portions of said second tubular member being approximately equidistant from said voltage conductor, insulating spacing means interposed between the ends of said first tubular member and the inwardly turned ends of said second tubular member, a capacitive element electrically coupled between said first tubular member and said second tubular member, and output means electrically coupled to said capacitive element and extending through said second tubular member.

9. The combination defined in claim 8 further including current sensing means located between and inwardly turned end portion of said second tubular member and the opposite wall of said second tubular member.

10. Claim 8 having output means electrically coupled to said first tubular member and extending through said second tubular member.

References Cited
UNITED STATES PATENTS

| | | | |
|---|---|---|---|
| 2,328,150 | 8/1943 | Kniepen | 174—143 X |
| 2,440,679 | 5/1948 | Fountain | 324—126 X |
| 2,504,647 | 4/1950 | Camilli | 324—109 X |

FOREIGN PATENTS

| | | |
|---|---|---|
| 339,835 | 8/1921 | Germany. |

RUDOLPH V. ROLINEC, *Primary Examiner.*

G. R. STRECKER, *Assistant Examiner.*